(12) United States Patent
Purdy et al.

(10) Patent No.: US 10,061,466 B2
(45) Date of Patent: Aug. 28, 2018

(54) METHOD FOR AUTOMATICALLY ADJUSTING THE MAGNIFICATION AND OFFSET OF A DISPLAY TO VIEW A SELECTED FEATURE

(71) Applicant: Keysight Technologies, Inc., Minneapolis, MN (US)

(72) Inventors: Glen L. Purdy, Loveland, CO (US); Jonathan Helfman, Loveland, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 358 days.

(21) Appl. No.: 13/750,366

(22) Filed: Jan. 25, 2013

(65) Prior Publication Data

US 2014/0215379 A1 Jul. 31, 2014

(51) Int. Cl.
*G06F 3/0481* (2013.01)

(52) U.S. Cl.
CPC .. *G06F 3/0481* (2013.01); *G06F 2203/04806* (2013.01)

(58) Field of Classification Search
CPC ....... G06F 3/0481; G06F 3/048; G06F 9/4443
USPC ........................................................ 715/781
See application file for complete search history.

(56) References Cited

U.S. PATENT DOCUMENTS

| | | | |
|---|---|---|---|
| 2003/0179242 A1* | 9/2003 | Alexander et al. | 345/781 |
| 2005/0188333 A1 | 8/2005 | Hunleth | |
| 2010/0271318 A1 | 10/2010 | Li | |
| 2011/0012813 A1 | 1/2011 | Suda | |
| 2011/0283228 A1* | 11/2011 | Hiraiwa et al. | 715/808 |
| 2012/0174029 A1 | 7/2012 | Bastide | |

FOREIGN PATENT DOCUMENTS

| | | |
|---|---|---|
| CN | 101876877 A | 11/2010 |
| CN | 102243642 A | 11/2011 |
| CN | 102541439 A | 7/2012 |

OTHER PUBLICATIONS

China Office Action dated Nov. 28, 2017, Application No. 201310725913.5.

* cited by examiner

*Primary Examiner* — Angie Badawi

(57) ABSTRACT

A method for operating a display in a data processing system to provide a view of a portion of a data array on a display screen is disclosed. The method includes providing a first display window characterized by a first offset, a first horizontal gain, and a first vertical gain and receiving a feature input from a user indicating a selected feature in the first display window. The data processing system automatically provides a second display window characterized by a second offset and a second horizontal gain and a second vertical gain. The second offset, the second horizontal gain and the second vertical gain are chosen such that the feature is at a predetermined location in the second display window and the second horizontal gain and second vertical gain are chosen such that the selected feature occupies a predetermined portion of the second display window.

2 Claims, 6 Drawing Sheets

METHOD FOR AUTOMATICALLY ADJUSTING THE MAGNIFICATION AND OFFSET OF A DISPLAY TO VIEW A SELECTED FEATURE

BACKGROUND

Many modern electronic instruments collect and display giga-samples of some measured quantity. Displaying this data for analysis by a user presents challenges. The amount of data is too large to view on a single display with a resolution that allows small features to be seen accurately. Accordingly, the display on the instrument is utilized as a window that views a portion of the stored data array at a time.

For the purposes of this discussion, a data array is defined to be an ordered set of measurements in which each member of the array is characterized by a value and an index in the array. A plot of the data typically involves plotting the data values as a function of the index with the index translated to time or some other variable. For example, in an oscilloscope, the data array is typically a series of amplitude measurements with the index corresponding to the time at which the measurement was made.

A display window is defined to be a plot of the data array for index values from starting value through some ending value. Typically, the vertical axis of the plot corresponds to the data values, and the horizontal axis corresponds to the corresponding index values. The starting value is referred to as the offset of the window. The magnification of the window is defined to be the length of the display window in pixels on the display screen divided by the difference between the ending value of the index and the beginning value.

Increasing the magnification is often referred to as zooming in, as the data values are displayed with greater separation between the values. The user typically selects a zoom level that allows the user to search for features of interest in the data. At this stage of the examination, the user typically selects a zoom level that allows the user to view the maximum amount of data in the window while still being able to detect features of interest that occur in the window. However, the magnification is typically insufficient to view the details of a feature found in such a scan of the data. To view a feature of interest, the user must "zoom in" on the feature of interest. This operation typically requires the user to reposition the window such that the feature is within the window and then increase the magnification to view the details of the feature. If the feature of interest is not accurately centered in the window, the zoom operation can result in the feature of interest being moved to a location outside the window. The user must then reposition the window at the new zoom level, and possibly, again change the zoom to provide the desired level of detail. When the instrument has a very large data set, zooming in on a feature of interest often requires multiple passes. This procedure is time consuming, and often, frustrating.

SUMMARY

The present invention includes a method for operating a display in a data processing system to provide a view of a portion of a data array on a display screen. The method includes providing a first display window characterized by a first offset, a first horizontal gain, and a first vertical gain and receiving a feature input from a user indicating a selected feature in the first display window. The data processing system automatically provides a second display window characterized by a second offset and a second horizontal gain and a second vertical gain. The second offset, the second horizontal gain and the second vertical gain are chosen such that the feature is at a predetermined location in the second display window and the second horizontal gain and second vertical gain are chosen such that the selected feature occupies a predetermined portion of the second display window. The second horizontal gain is greater than the first horizontal gain.

In one aspect of the invention, the input from the user includes an indication of a feature type for the selected feature and the second horizontal gain depends on the feature type. In another aspect of the invention, the data processing automatically determines a first value characterizing the selected feature and displays the first value on the display screen.

In a still further aspect of the invention, the second display window includes a popup window in the first display window.

In another aspect of the invention, the data processing system receives a gain input from the user and automatically provides a third display window characterized by a third offset, a third horizontal gain and a third vertical gain in which the third horizontal gain is equal to a predetermined value times the second horizontal gain, and the third offset is chosen such that the selected feature occupies a second predetermined portion of the third display window.

DETAILED DESCRIPTION

For the purposes of the present discussion, a feature is defined to be a region of the data array that satisfies some predetermined algorithm, which allows a data processing system to identify a region of the data array as containing that feature. For example, one class of features can be defined to be a region of the data array in which the absolute value of the rate of change of the data values in the array as a function of the index of the array is greater than a predetermined value. A region of the data array will be said to be slowly changing if the absolute value of the rate of change of the data values as a function of the index is less than a first threshold value in that region. Similarly, a region of the data array will be said to be rapidly changing if the absolute value of the rate of change of the data values as a function of the index is greater than a second threshold value in that region. For example, an "edge" is a region in which the array values start in a first slowly changing region and transition to a second region in which the array values are rapidly changing in one direction and then return to a third region in which the data values are slowly changing. Similarly, a "peak" is a region in which the array values start in a first slowly changing region and transition to a second region in which the array values are rapidly changing in the positive direction followed by a region in which the data values are rapidly changing in the opposite direction, followed by a third region in which the data values are slowly changing.

The present invention is based on the observation that for any particular type of instrument, there are a number of features that are typically of interest and for which the instrument can be provided with an automatic protocol that adjusts the magnification and offset. In one aspect of the invention, the user selects a feature and indicates the feature type. The data processing system that generates the display then automatically zooms in on the selected feature in a manner that provides sufficient resolution for the user to view the details of the feature.

Consider an oscilloscope. A user often wishes to look at features such as edges and peaks in the measured signals. In one aspect of the present invention, the user selects a feature of a particular type and points to the feature in the current display. The data processing system associated with the instrument then automatically adjusts the offset and magnification of the display so that the feature of interest is centered in the display at a magnification that allows the user to use the available resolution of the display to see the details of the feature.

Figure 1:
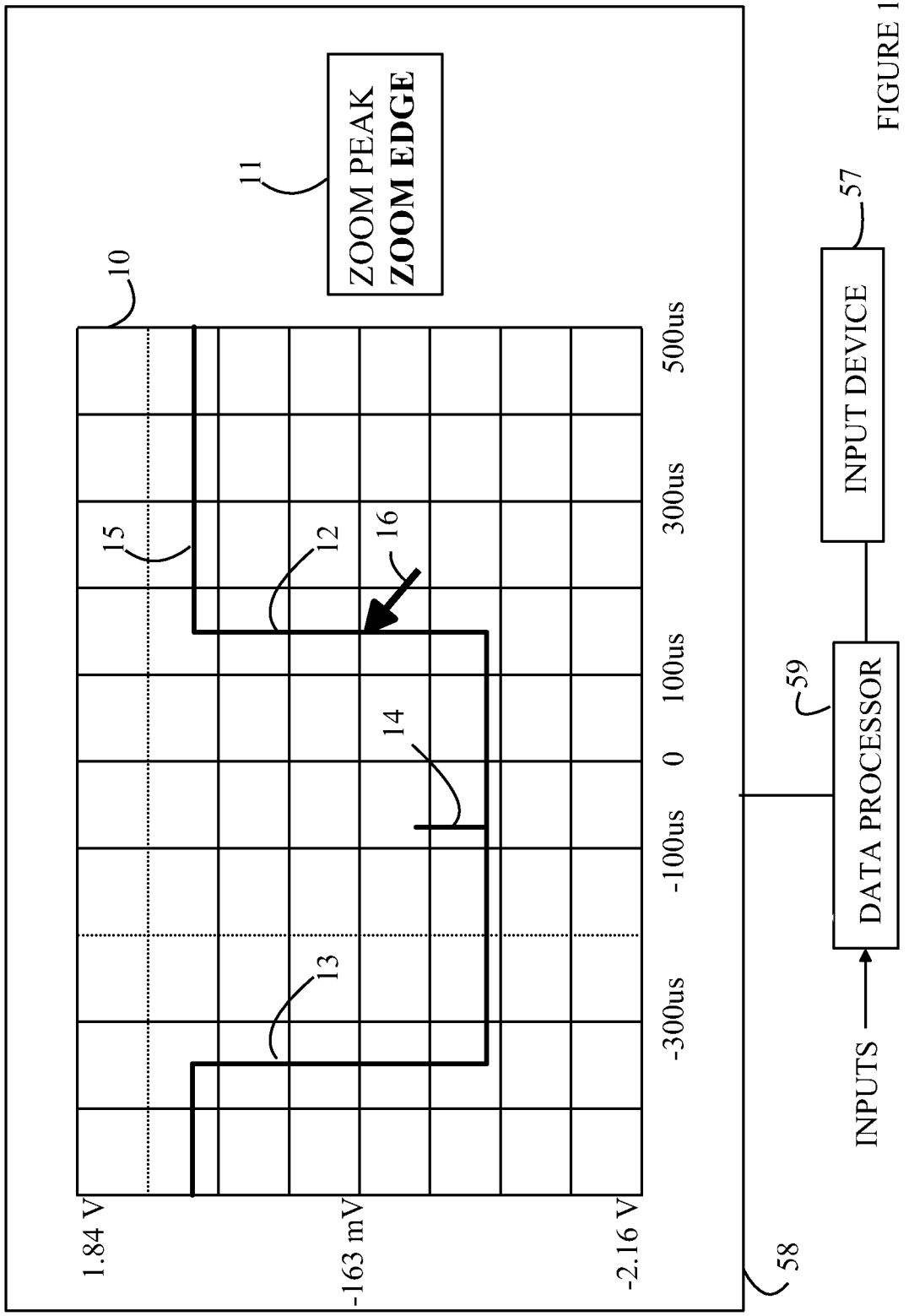
FIG. 1 illustrates an oscilloscope that is based on a data processor that receives the signal inputs to be measured.
Figure 2:
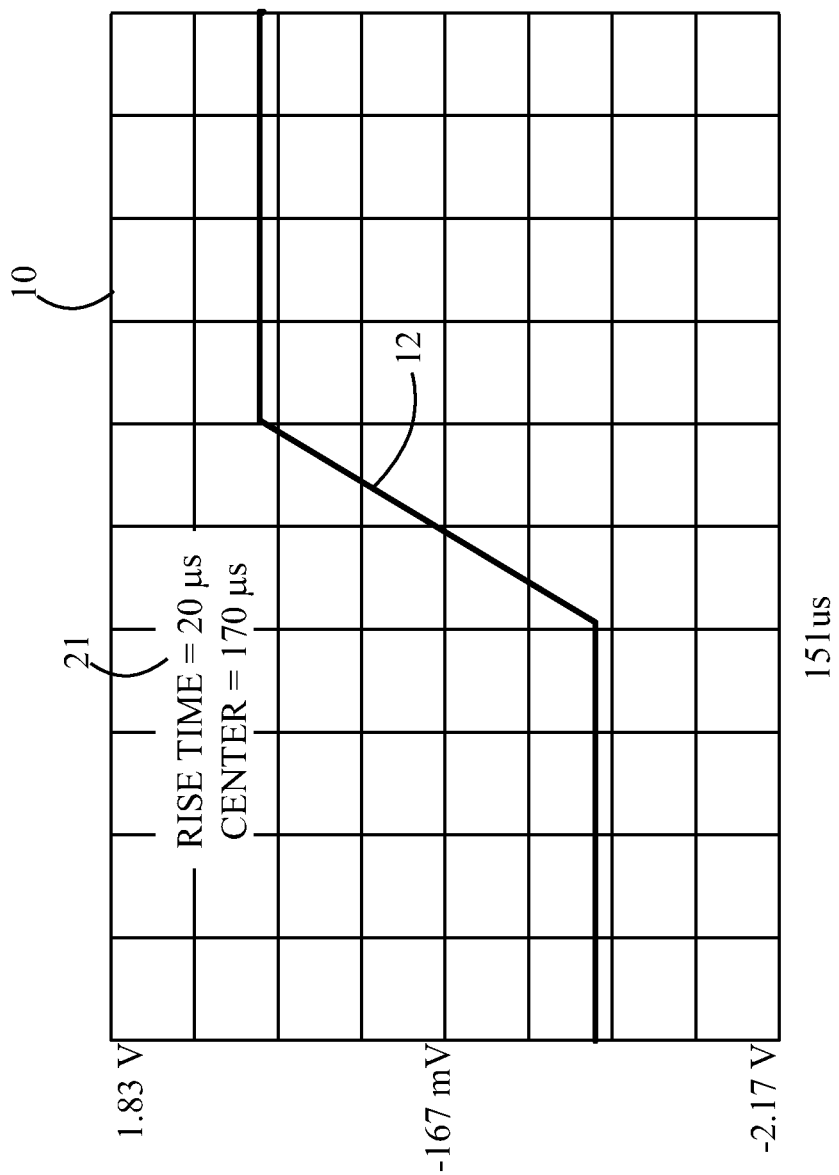
FIG. 2 illustrates the magnified display generated when the user selects edge 12.

Refer now to FIG. 1, which illustrates an oscilloscope that is based on a data processor 59 that receives the signal inputs to be measured. The data processor has a display 58 that includes display screen 10 showing a trace 15 at a first magnification. Trace 15 includes edges shown at 12 and 13 and a narrow peak shown at 14. A user who wishes to see edge 12 at a higher magnification selects edge 12 using a pointing device 16 and indicates that the controller in the oscilloscope is to zoom in on the edge. In the example shown in FIG. 1, the user "right clicks" the input device 57 and selects "ZOOM EDGE" from a popup menu 11. Refer now to FIG. 2, which illustrates the magnified display generated when the user selects edge 12 as described above. The controller automatically sets the offset and magnification such that edge 12 is centered in display screen 10. In addition, the controller sets the magnification such that the feature occupies some predetermined fraction of the display area. In one aspect of the invention, the controller also displays a set of predetermined measurements of the feature in question. In the example shown in FIG. 2, the controller displays the rise time and the location of the edge as shown at 21.

Figure 3:
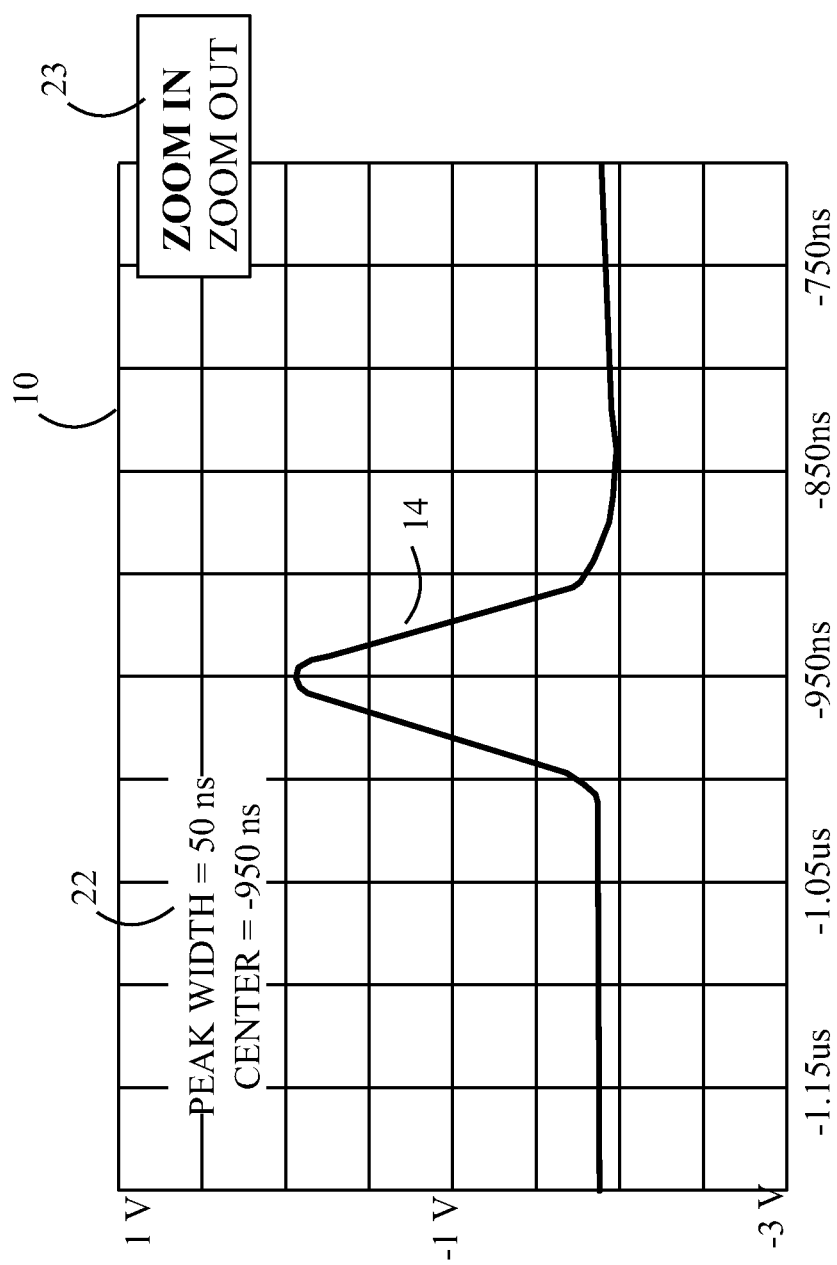
FIG. 3 illustrates a display screen in the case in which the user selected peak 14 and "zoom peak".

Refer now to FIG. 3, which illustrates display screen 10 in the case in which the user selected peak 14 and "zoom peak". The controller selected a magnification that allowed the peak to occupy a predetermined portion of the time base. In addition, the vertical magnification was adjusted such that the peak occupies a predetermined portion of the vertical range of the display. The relevant measurement parameters for a peak are computed by the controller and shown at 22.

It should be noted that the vertical and horizontal gains can be set automatically such that the selected feature fills a predetermined portion of the zoomed display. The portion of the display that is so filled can depend on the selected feature.

Figure 4:
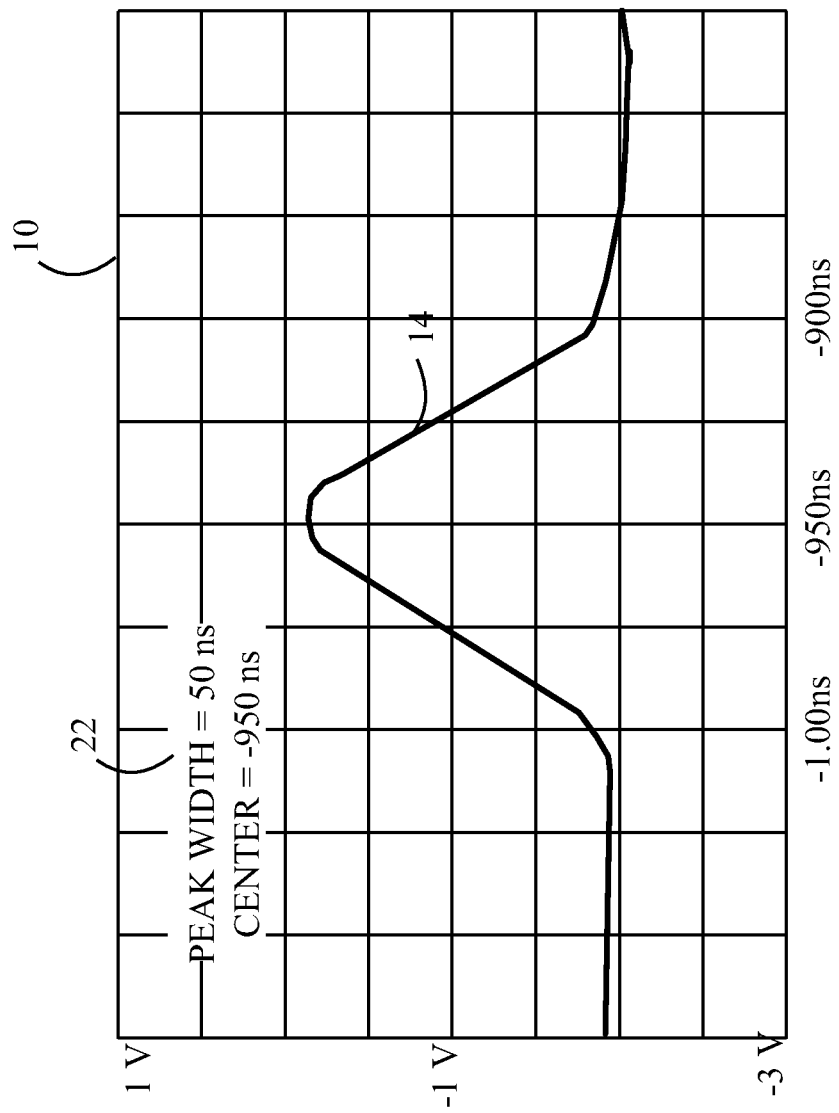
FIG. 4 illustrates a display screen when the user selects "zoom in" from a menu.

In one aspect of the invention, the user can further adjust the magnification of the zoomed display while maintaining the feature centered on the display screen. In one exemplary embodiment, the user selects a special zoom in command from a menu that is presented when the user right clicks the pointing device or selects a drop down menu. A typical menu is shown at 23. Refer now to FIG. 4, which illustrates display screen 10, when the user selects "zoom in" from menu 23. The feature remains centered in display screen 10; however, the horizontal gain has been increased by a predetermined factor. Similarly, the user could select "zoom out" to display more of the curve in the vicinity of the peak, in which case, the new display would be centered at the feature but the horizontal gain would be decreased by a predetermined factor.

Figure 5:
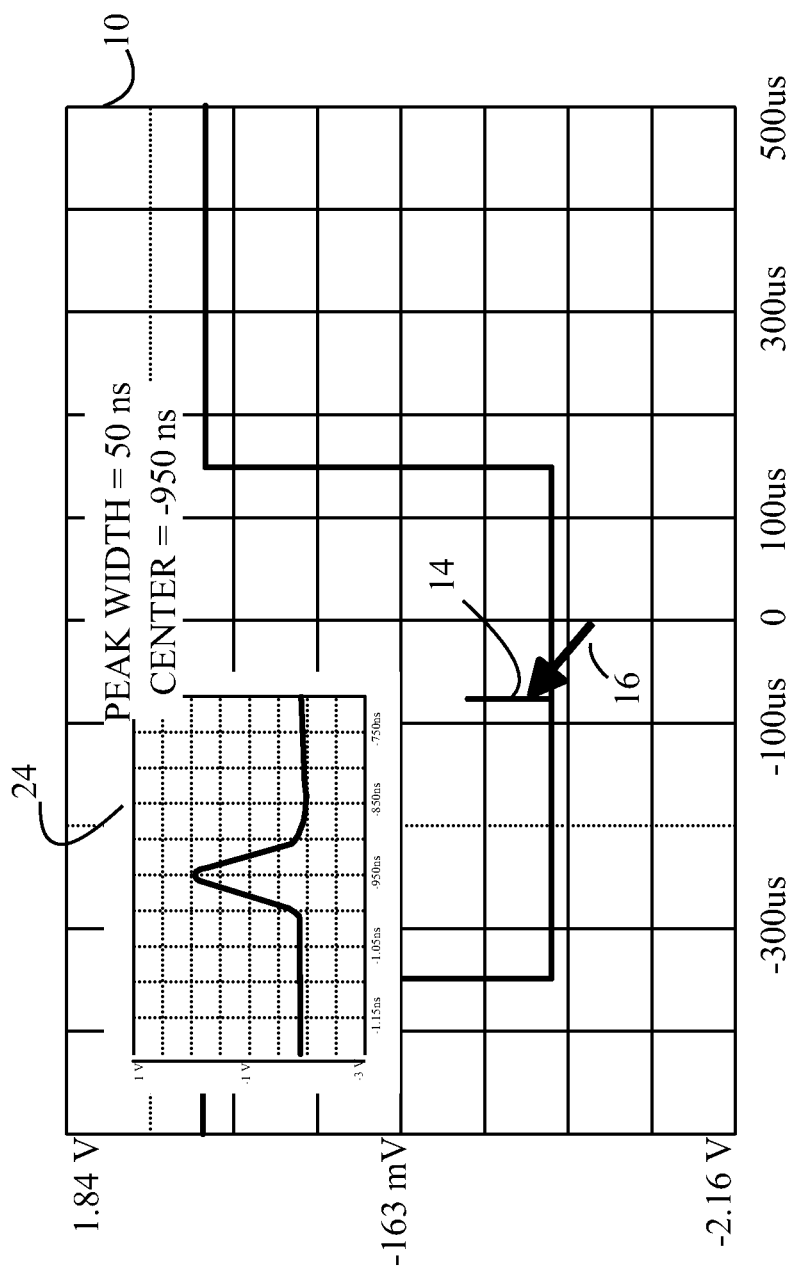
FIG. 5 illustrates the display shown in FIG. 1 with a popup window for the zoomed display.

In the above-described embodiments, the zoomed display replaces the original display on the instrument. However, embodiments in which the zoomed display appears as a popup window on the original display can also be implemented. Refer now to FIG. 5, which illustrates the display shown in FIG. 1 with a popup window for the zoomed display. In this embodiment, the user selected peak 14 and "zoom peak". A window 24 then pops up showing the feature in question in the zoomed mode. When the user is finished viewing the zoomed feature, the user executes another command such as pressing the "ESC" key on the keyboard associated with the instrument, and window 24 disappears.

The above-described embodiments are tailored to an oscilloscope. However, as noted above, the present invention can be utilized in a number of different instruments. For each instrument, there will, in general, be different features that may be of interest as well as some features that are desirable for a number of different instruments. Features corresponding to peaks are generally of interest in many different instruments. For example, frequency analyzers often display spectra that includes a number of peaks. In contrast, a frequency analyzer could benefit from a feature-based zoom that displays the selected frequency peak and a predetermined number of harmonics of that peak.

Figure 6:
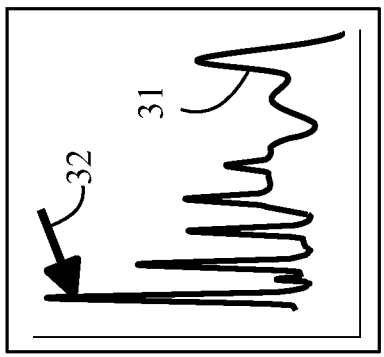
FIGS. 6-8 illustrate the automatic zoom feature of the present invention with respect to a frequency analyzer.
Figure 7:
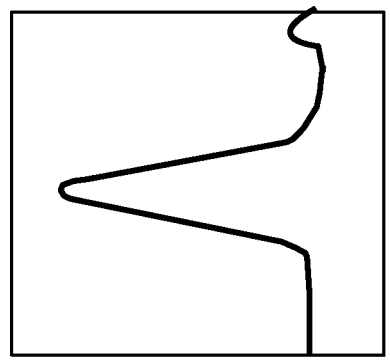
Figure 8:
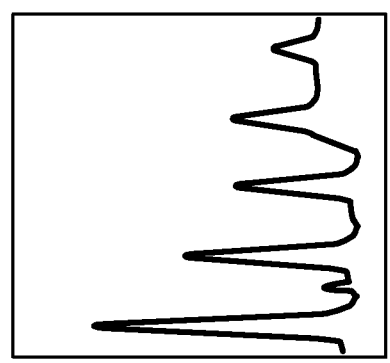

Refer now to FIGS. 6-8, which illustrate the automatic zoom feature of the present invention with respect to a frequency analyzer. FIG. 6 illustrates a spectrum 31 having a number of peaks. In one mode, the user selects a peak using pointer 32 and selects a peak zoom mode. The resultant new display is shown in FIG. 7 and is analogous to the zoom display discussed above with reference to FIG. 3. In an alternate zoom mode, the user indicates that the user wishes to zoom in on the selected peak and a predetermined harmonics of that peak. The resultant display is shown in FIG. 8. In addition, the controller that operates the instrument can provide specific data with respect to the zoomed features such as the amplitudes and frequencies of each of the harmonics. To simplify the drawings, the information displays, which are analogous to those discussed above, have been omitted.

In the above-described embodiments, the user selects the feature and indicates the type of feature. However, embodiments in which the data processing system automatically determines the type of feature by examining the data array in the vicinity of the region selected by the user can also be constructed. In this case, a plurality of features are defined in the software in terms of the progression of slopes of the data array or other parameters computed from the data. The data processing system then compares the slopes in the region indicated by the user to determine which feature is a best match to the data in the selected region. The data processing then zooms in on the feature in question to allow the user to examine the feature.

The present invention also includes any computer readable medium that stores instructions that cause a computer reading that medium to execute the method of the present invention. For the purposes of the present discussion, any computer readable medium that qualifies as patentable subject matter under 35 U.S.C. 101 will be defined to be a computer readable storage medium. Such media include non-transitory storage media such as non-volatile memories, magnetic and optically-based disk drives and storage elements read by those disk drives.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a display in a data processing system to provide a view of a portion of a data array on a display screen, said method comprising:
providing a first display window characterized by a first offset, a first horizontal gain, and a first vertical gain;
receiving a feature input from a user indicating a selected feature in said first display window; and
automatically providing a second display window characterized by a second offset and a second horizontal gain and a second vertical gain, wherein said second offset, said second horizontal gain and said second vertical gain are chosen such that said selected feature is at a predetermined location in said second display window and said second horizontal gain and second vertical gain are automatically chosen by said data processing system such that said selected feature occupies a predetermined portion of said second display window, said second horizontal gain being greater than said first horizontal gain, said predetermined portion of said second display window depending on said selected feature,
wherein said feature input from said user comprises an indication of a feature type for said selected feature and wherein said second horizontal gain depends on said feature type, said feature type being chosen from a plurality of predetermined feature types.

2. A method for operating a display in a data processing system to provide a view of a portion of a data array on a display screen, said method comprising:
providing a first display window characterized by a first offset, a first horizontal gain, and a first vertical gain;
receiving a feature input from a user indicating a selected feature in said first display window; and
automatically providing a second display window characterized by a second offset and a second horizontal gain and a second vertical gain, wherein said second offset, said second horizontal gain and said second vertical gain are chosen such that said selected feature is at a predetermined location in said second display window and said second horizontal gain and second vertical gain are automatically chosen by said data processing system such that said selected feature occupies a predetermined portion of said second display window, said second horizontal gain being greater than said first horizontal gain, said predetermined portion of said second display window depending on said selected feature,
wherein said input from said user comprises an indication of a feature type for said selected feature and wherein said second vertical gain depends on said feature type, said feature type being chosen from a plurality of predetermined feature types.

* * * * *